United States Patent
Ando et al.

(10) Patent No.: US 7,215,617 B2
(45) Date of Patent: May 8, 2007

(54) OPTICAL DISC DRIVE FOR ERASING THE POWER CALIBRATION AREA OF AN OPTICAL DISC

(75) Inventors: Junichi Ando, Atsugi (JP); Masao Fukaya, Atsugi (JP)

(73) Assignee: Mitsumi Electric Co., Ltd. (JP)

( * ) Notice: Subject to any disclaimer, the term of this patent is extended or adjusted under 35 U.S.C. 154(b) by 0 days.

(21) Appl. No.: 10/471,974

(22) PCT Filed: Mar. 22, 2002

(86) PCT No.: PCT/JP02/02783

§ 371 (c)(1),
(2), (4) Date: Feb. 11, 2004

(87) PCT Pub. No.: WO02/082433

PCT Pub. Date: Oct. 17, 2002

(65) Prior Publication Data
US 2004/0125720 A1 Jul. 1, 2004

(30) Foreign Application Priority Data
Mar. 30, 2001 (JP) .............................. 2001-102026

(51) Int. Cl.
G11B 7/0055 (2006.01)
(52) U.S. Cl. ................................. 369/47.53; 369/53.31
(58) Field of Classification Search ............... 369/47.53
See application file for complete search history.

(56) References Cited

U.S. PATENT DOCUMENTS

| 4,841,512 | A  | * | 6/1989 | Kubota et al. ............ | 369/53.36 |
| 5,412,793 | A  | * | 5/1995 | Kreifels et al. ............ | 711/101 |
| 6,021,103 | A  | * | 2/2000 | Tani ........................ | 369/47.11 |
| 6,301,212 | B1 | * | 10/2001 | Kubo et al. ............... | 369/53.2 |
| 6,704,263 | B1 | * | 3/2004 | Nijboer et al. ............ | 369/59.21 |
| 6,711,108 | B2 | * | 3/2004 | Mashimo et al. .......... | 369/47.53 |
| 6,765,851 | B2 | * | 7/2004 | Kawashima et al. ....... | 369/47.53 |
| 6,813,107 | B1 | * | 11/2004 | Lee ........................ | 360/39 |
| 2001/0033534 | A1 | * | 10/2001 | Takeda et al. ............ | 369/47.53 |
| 2001/0040846 | A1 | * | 11/2001 | Kawashima et al. ....... | 369/47.53 |

FOREIGN PATENT DOCUMENTS

| JP | 09-022529   |   | 1/1997 |
| JP | 09022529 A  | * | 1/1997 |
| JP | 10-134389   |   | 5/1998 |
| JP | 10134389 A  | * | 5/1998 |

OTHER PUBLICATIONS

Machine translation of JP 10-134389.*
Machine translation of JP 09-022529.*
English language abstract of Japanese Publication No. 09-022529, Jan. 21, 1997.
English language abstract of Japanese Publication No. 10-134389, May 22, 1998.

* cited by examiner

Primary Examiner—Thang V. Tran
Assistant Examiner—Nathan Danielsen
(74) Attorney, Agent, or Firm—Marger Johnson & McCollom, P.C.

(57) ABSTRACT

An optical disc drive that can surely erase the trial writing data recorded in the Test Area is disclosed. The optical disc drive of the present invention has a rotation driving mechanism for rotating a loaded optical disc, and an optical pick-up capable of recording data to the optical disc by emitting a laser beam onto the optical disc drive. In the erasing procedure for erasing the trial writing data recorded in the Test Area, CW erase procedure is carried out and the optical disc drive tries to reproduce the trial writing data. Then, it is determined whether an HF signal is detected or not, and the CW erase procedure is carried out again in the case where the HF signal is detected.

6 Claims, 5 Drawing Sheets

OPTICAL DISC DRIVE FOR ERASING THE POWER CALIBRATION AREA OF AN OPTICAL DISC

TECHNICAL FIELD

The present invention relates to an optical disc drive.

BACKGROUND ART

There are known optical disc drives, which record and/or reproduce information on an optical disc that is rewritable, such as CD-RW and the like.

Such optical disc drives include: a rotational driving mechanism for rotating a loaded optical disc; an optical pick-up (optical head) which is provided movably in a radial direction with respect to the loaded optical disc for emitting a laser beam to be able to record data (information) on the disc; and an optical pick-up moving mechanism equipped with a sled motor for moving the optical pick-up in the radial direction.

In the optical disc drive having such a function for recording data, it is required to acquire an optimum recording power (writing output of the laser beam) suitable for an inherent property of an optical disc and conditions of the circumstances before actually writing (recording) information onto the optical disc.

Acquiring the optimum recording power is referred to as OPC (Optimum Power Control). An OPC procedure is carried out at a region called as PCA (Power Calibration Area) that is positioned at the innermost region of an optical disc. The PCA is divided into two regions, i.e., a Test Area and a Count Area.

Trial writing is carried out in the Test Area by changing the output level of the laser beam in a stepwise manner, and the count (number of times) of trial writing (the count (number of times) of the OPC procedure) is recorded in the Count Area.

Further, in the case where there is no space to carry out trial writing in the Test Area, the optical disc drive carries out CW erase (Continuous Wave Erase) procedure to erase trial writing data that is recorded in the Test Area.

However, sometimes the trial writing data that is recorded in the Test Area cannot be erased completely by only one CW erase, and if trial writing is carried out in a state where the trial writing data still remains in the Test Area, overwrite procedure is carried out on the portion in which the writing data remains.

In this case, an optimum output level of the laser beam cannot be acquired, and an improper output level of the laser beam may be determined as the optimum recording power.

When recording data is carried out at the improper output level of the laser beam that is determined in the OPC procedure, for example, in the case where the output level of the laser beam is higher than the optimum output level, the optical disc may suffer a significant damage, on the other hand, in the case where the output level of the laser beam is lower than the optimum output level, the recording procedure may be insufficient, thereby being incapable of recording data accurately.

Further, in this case, when the recorded information is reproduced, high-quality signals cannot be obtained.

SUMMARY OF THE INVENTION

It is an object of the present invention to provide an optical disc drive that can surely erase trial writing data that is recorded in a Test Area.

In order to achieve the object, in accordance with one aspect of the present invention, the present invention is directed to an optical disc drive which can record and reproduce data onto and from an optical disc having a test area for trial writing when the optical disc is loaded into the optical disc drive. The optical disc drive comprises:
a rotational driving mechanism for rotating the optical disc;
an optical pick-up capable of recording the data to the optical disc by emitting a laser beam onto the optical disc; and
confirming means for confirming whether the trial writing data has been erased or not in an erasing procedure for erasing the trial writing data that has been recorded in the test area.

In accordance with another aspect of the present invention, the present invention is directed to an optical disc drive which can record and reproduce data to and from an optical disc having a test area for trial writing and a count area for recording the count number of carrying out trial writing in the test area when the optical disc is loaded into the optical disc drive. The optical disc drive comprises:
a rotational driving mechanism for rotating the loaded optical disc;
an optical pick-up capable of recording the data to the optical disc by emitting a laser beam onto the optical disc; and
confirming means for confirming whether the trial writing data has been erased or not in an erasing procedure for erasing the trial writing data that has been recorded in the test area and the count area.

According to the optical disc drives mentioned above, the trial writing data that is recorded in the test area can be surely erased. Thus, in the OPC procedure, the trial writing to the test area is properly carried out, and the output level of the laser beam can be surely set at an appropriate value.

In this case, it is preferred that the optical disc drive is constituted so as to erase the trial writing data in the case where the count number of carrying out trial writing becomes more than a predetermined number.

The optical disc drive may be constituted so as to erase the trial writing data in the case where the count number of carrying out trial writing becomes 99 or 100.

Further, it is preferred that the optical disc drive is constituted so as to retry to erase the trial writing data in the case where the confirming means confirms that the trial writing data is not yet erased after trying to erase the trial writing data in the erasing procedure.

Furthermore, it is preferred that the optical disc drive is constituted so as to repeatedly carry out the erasion of the trial writing data until the trial writing data is erased in the erasing procedure.

Here, it is preferred that the confirming means confirms whether the trial writing data has been erased or not by trying to reproduce the trial writing data in the erasing procedure.

In this case, it is preferred that the confirming means determines that the trial writing data is not yet erased in the case where a predetermined signal is detected when trying to reproduce the trial writing data.

Further, it is preferred that the predetermined signal is an HF signal.

In the present invention, it is preferred that the output level of the laser beam during the erasion of the trial writing data can be set at any one of a plurality of output levels of the laser beam.

Further, it is preferred that the output level of the laser beam during the erasion of the trial writing data is lower than the output level of the laser beam during trial writing.

Furthermore, it is preferred that the optical disc is an overwritable optical disc.

In this case, it is preferred that the optical disc includes a CD-RW.

BEST MODE FOR CARRYING OUT THE INVENTION

A detailed description will now be given for the preferred embodiments of an optical disc drive according to the present invention with reference to the appended drawings.

Figure 1:
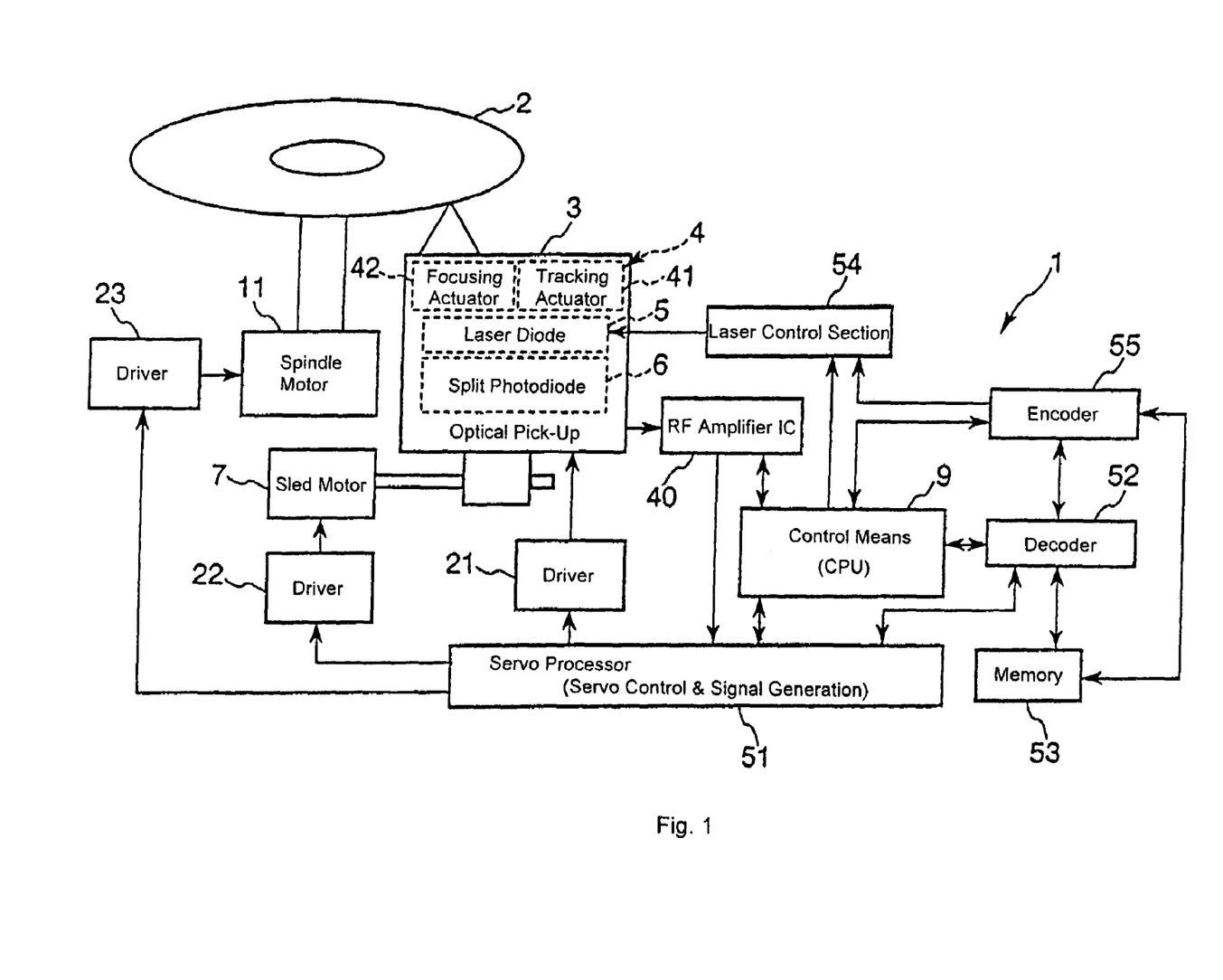
FIG. 1 is a block diagram illustrating an embodiment of an optical disc drive according to the present invention.

FIG. 1 is a block diagram illustrating an embodiment of an optical disc drive according to the present invention.

The optical disc drive 1 shown in FIG. 1 is an optical disc drive for recording and reproducing data onto and from a rewritable optical disc 2 such as CD-RW.

A spiral pre-groove (WOBBLE) (not shown) is formed along a track in the optical disc 2.

The spiral pre-groove is recorded with Absolute Time In Pre-groove (ATIP) information (time information), and meanders for a predetermined period (22.05 kHz as a reference speed) in a radial direction of the optical disc 2. More specifically, the ATIP information to be recorded is biphase modulated and frequency-modulated at a carrier frequency of 22.05 kHz.

The pre-groove may function as a guide groove to form pits and/or lands (recording of pits and lands) for optical disc 2. Further, information recorded in the pre-groove may be utilized for controlling a rotational speed of the optical disc 2. Additionally, the information recorded may be reproduced and used to specify a recording position (absolute time) on the optical disc 2.

The optical disc drive 1 has a rotation driving mechanism for rotating a turntable on which an optical disc 2 is loaded. The rotation driving mechanism mainly has a spindle motor 11 for rotating a turntable, a driver 23 for driving the spindle motor 11, and the turntable (not shown) on which the optical disc 2 is loaded, which is fixed to a rotation shaft of the spindle motor 11.

Further, the optical disc drive 1 includes an optical pick-up (optical head) 3 capable of moving in a radial direction of the loaded optical disc 2 (a radial direction of the turntable with respect to the optical disc 2 that is loaded on the turntable); an optical pick-up moving mechanism for moving the optical pick-up 3 in the radial direction of the optical disc 2 or the turntable; a control means (CPU) 9; an RF amplifier IC 40; a servo processor (DSP) 51; a decoder 52; a memory 53 such as RAM (Random Access Memory) and the like; a laser control section 54; and an encoder 55. Hereinafter, the radial direction of the optical disc 2 loaded in the optical disc drive 1 will be referred to simply as "the radial direction."

The optical pick-up moving mechanism mainly includes a sled motor 7, a driver 22 for driving the sled motor 7, and a power transmission mechanism (not shown). A rotational speed of the sled motor 7 can be decelerated and transmitted to the optical pick-up 3 by the power transmission mechanism, thereby converting the rotational movement of the sled motor 7 into the linear movement of the optical pick-up 3.

The optical pick-up 3 includes an optical pick-up body (optical pick-up base) (not shown) that may be equipped with a laser diode (light source) 5 for emitting a laser beam and a split photodiode (light-receiving portion) 6, and an objective lens (condenser) (not shown). The laser diode 5 is driven and controlled by means of the laser control section 54.

The objective lens is supported by suspension springs (biasing means) (not shown in the drawings) provided on the optical pick-up base. Further, the objective lens is arranged so as to be movable with respect to the optical pick-up base in both a radial direction of the turntable and an optical axis direction of the objective lens (i.e., the rotational direction of the optical disc 2 (turntable)). Hereinafter, the direction of the optical axis of the objective lens will be referred to simply as the "optical axis direction," and the direction of the rotational axis of the optical disc 2 will be referred to simply as the "rotational axis direction."

The objective lens is initially positioned at a reference position (center point) of the objective lens, which is predetermined on the optical pick-up base, i.e., a neutral position. Hereinafter, the reference position of the objective lens will be referred to simply as the "reference position."

When the objective lens is deviated away from its reference position, it is biased back toward the reference position by the restoring force of the suspension springs.

The optical pick-up 3 also has an actuator 4 for moving the objective lens with respect to the optical pick-up base. The actuator 4 includes a tracking actuator 41 for moving the objective lens in the radial direction with respect to the optical pick-up base, and a focusing actuator 42 for moving the objective lens in the optical axis direction (rotational axis direction).

The tracking actuator 41 and the focusing actuator 42 of the actuator 4 may be respectively driven by the driver 21.

The control means 9 is generally constituted from a microcomputer (CPU). The control means 9 carries out overall control of the optical disc drive 1. Namely, the control means 9 controls the optical pick-up 3 (including the actuator 4, the laser diode 5 and the like), the sled motor 7, the spindle motor 11, the RF amplifier IC 40, the servo processor 51, the decoder 52, the memory 53, the laser control section 54, the encoder 55, and the like.

Further, confirming means for confirming whether or not trial writing data has been erased in an erase step in which the trial writing data that is recorded in the PCA (Power Calibration Area) has been erased is constituted from the optical pick-up 3, the control means 9, the RF amplifier IC 40, the laser control section 54 and the like.

The optical disc drive 1 may be removably connected to an external device such as a computer via an interface control section (not shown in the drawings) to carry out data communications between the optical disc drive 1 and the external device.

Next, operation of the optical disc drive 1 will be described.

The optical disc drive 1 moves the optical pick-up 3 to a target track (target address). When the optical pick-up 3 reaches the target track, the optical disc drive 1 carries out various controls such as focus serve control, tracking servo control, sled servo control and rotation number control (rotational speed control) and the like. In this way, the optical disc drive 1 records (writes) and reproduces (reads out) information (data) to and from a predetermined track (target track) of the optical disc 2.

When data (signals) is recorded onto the optical disc 2, data (ATIP information and recorded data) is reproduced from the pre-groove that is formed on the optical disc 2, and then the data is recorded onto the optical disc 2 along the pre-groove.

When the data (signals) to be recorded onto the optical disc 2 is inputted into the optical disc drive 1 via an interface control section (not shown), the data is inputted into the encoder 55.

The data is encoded in the encoder 55, and then undergoes modulation (EFM modulation) by a modulation method known as EFM (Eight to Fourteen Modulation) to form ENCODE EFM signals.

The ENCODE EFM signals are signals formed from pulses each having a predetermined length (period) of any one of 3T–11T. The ENCODE EFM signals are inputted from the encoder 55 to the laser control section 54.

Further, an analog WRITE pulse signal (voltage) is outputted from a D/A converter (not shown in the drawings) incorporated in the control means 9 and then inputted into the laser control section 54.

The laser control section 54 may switch the level of the WRITE pulse signal inputted from the control means 9 among a high level (H), an erase level and a low level (L) based on the ENCODE EFM signal. Then, the laser control section 54 outputs the signal having any one of these levels, thereby controlling the drive (operations) of the laser diode 5 in the optical pick-up 3.

Figure 2:
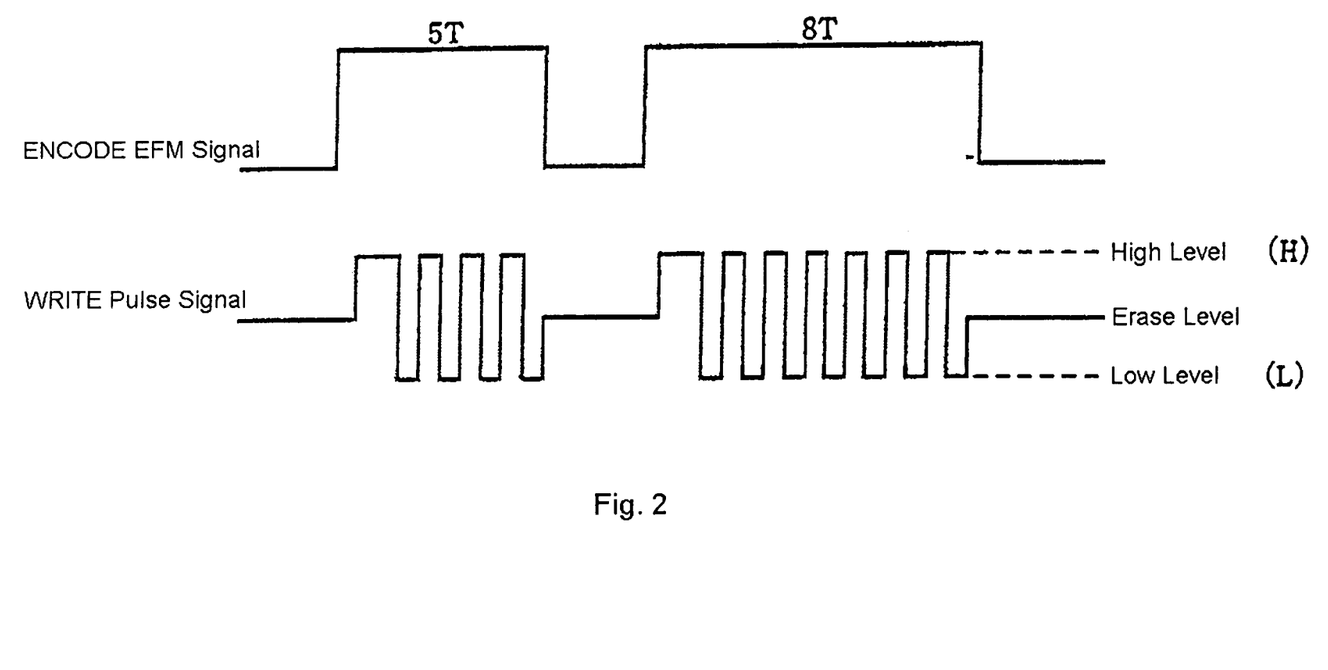
FIG. 2 is a timing chart illustrating an ENCODE EFM signal outputted from an encoder and a WRITE pulse signal outputted from a laser control section in the optical disc drive shown in FIG. 1 according to the present invention.

FIG. 2 is a timing chart illustrating the ENCODE EFM signal outputted from the encoder 55 and the WRITE pulse signal outputted from the laser control section 54.

As shown in FIG. 2, the laser control section 54 alternates the high-level (H) WRITE pulse signal and the low-level (L) WRITE pulse signal to output the signal while the ENCODE EFM signal is in a high level (H), thereby increasing the output level of the laser beam (in order to establish the output for writing). On the other hand, the laser control section 54 outputs the erase-level (DC level) WRITE POWER signal while the ENCODE EFM signal is in a low level (L), thereby decreasing the output level of the laser beam.

Accordingly, when the ENCODE EFM signal is in the high (H) level, a pit having a predetermined length is formed (written) in the optical disc 2, and when the ENCODE EFM signal is in the low (L) level, a land having a predetermined length is formed (written) in the optical disc 2.

In this way, data is written (recorded) in a predetermined track of the optical disc 2

Data is sequentially recorded from the inner side toward the outer side of the optical disc 2 along the pre-groove in the optical disc 2.

In the encoder 55, a predetermined ENCODE EFM signal (random EFM signal) is generated in addition to the above-mentioned ENCODE EFM signal. The random EFM signal is used for output adjustment (power control) of the laser when trial writing in a test area is carried out under OPC (Optimum Power Control) procedure for determining an optimum laser output during recording of data.

Next, the OPC procedure will be described with reference to FIGS. 3 and 4. In the optical disc 2, a Lead-in Area having the ATIP specific information, a PMA (Program Memory Area), and a PCA (Power Calibration Area) are arranged in this order from the outer side to the inner side in a program area (see FIG. 3). The PMA is an area to write a start time and an end time of a track and the like.

Figure 3:
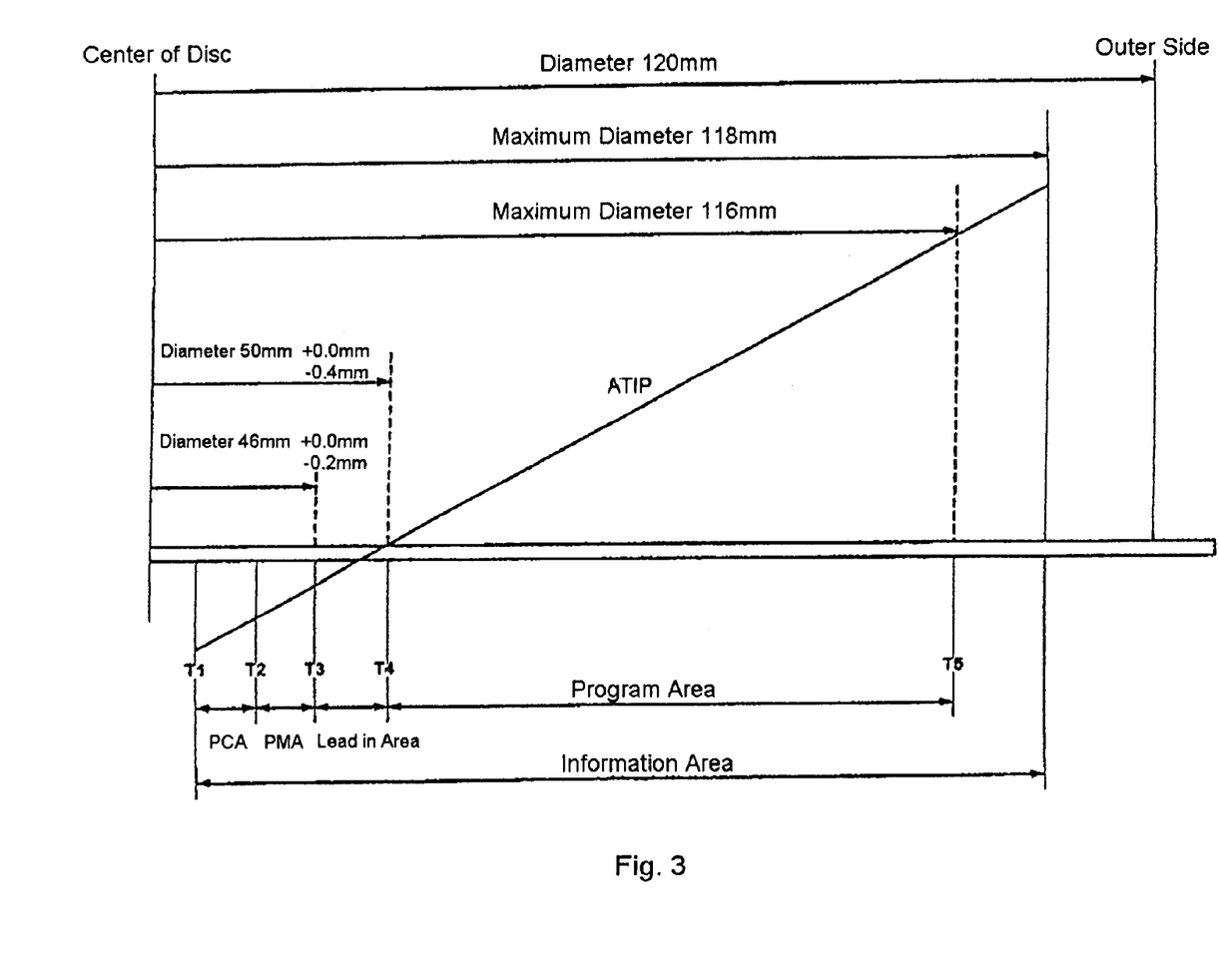
FIG. 3 is a diagram illustrating an information record area of the optical disc drive for erasing the power calibration area (PCA) according to the present invention.

The PCA is further divided into a Test Area for carrying out trial writing and a Count Area for recording the count number of trial writing (see FIG. 3). The Test Area has a space of 15 ATIP frame×100, while the Count Area has a space of 1 ATIP frame×100.

In the OPC procedure, trial writing is carried out for a Test Area of each optical disc. During trial writing in a Test Area under the OPC procedure, the random EFM signal is inputted into the laser control section 54 from the encoder 55. Further, the 15-level WRITE pulse signals are generated in the control means 9, and then the WRITE pulse signals are outputted from the D/A converter (not shown in the drawings) in the control means 9 to input into the laser control section 54.

Then, based on the random EFM signal, the laser control section 54 switches the level of the WRITE pulse signal inputted from the control means 9 among the high level (H), the erase level and the low level (L) and then outputs such signals, thereby controlling the operations of the laser diode 5 of the optical pick-up 3. This procedure is carried out on the basis of the high-level WRITE pulse signals (H), each of which has any one of 15 levels.

In this way, trial writing to the test area is carried out with laser beams each having any one of 15 output levels. Such trial writing can be carried out a plurality of (many) times (for example, 100 times). A flag indicating one trial writing is established in the Count Area with each trial writing.

In the OPC procedure, defining γ as a rate of change of the ratio of the power of the laser beam to the degree of modulation (such as peak amplitude / reference amplitude) of the signal with a period corresponding to 11T In the random EFM signals, it is determined that an optimum laser output level is the output level of the laser beam corresponding to γ that is the closest to a predetermined value γ (for example, 1.65) within 13 γ values corresponding to the WRITE pulse signals each having any one of the 15 levels.

Figure 4:
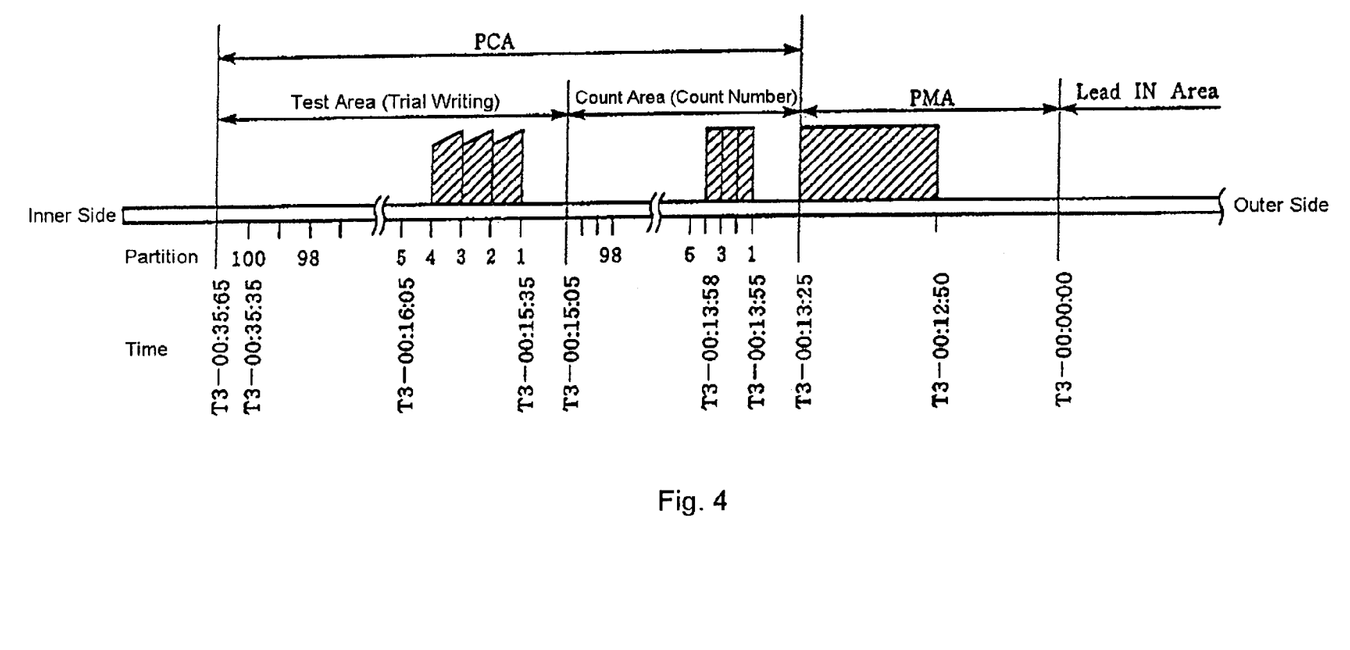
FIG. 4 is a diagram illustrating a PCA and the like to be required for the OPC procedure of the optical disc drive according to the present invention.

In this regard, as shown in FIGS. 3 and 4, a start time T3 of the Lead-in Area, a start time T4 of the Program Area (i.e., an end time of the Lead-in Area), and a final startable time T5 of the Lead-out Area are respectively encoded in the ATIP information. A PMA start time T2 and a PCA start time T1 are respectively recognized as positions that are shifted from the position corresponding to the the time T3 toward the inner side of the optical disc. The boundary between the Test Area and the Count Area is also recognized in the same manner. In this way, in the OPC procedure, based on the ATIP information and the like, the writing positions in the Test Area and the Count Area can be identified.

In the optical disc drive 1, an erase step for erasing trial writing data that has recorded in the Test Area is carried out in the case where the whole of the space for trial writing in the Test Area has already been carried out trial writing, or in the case where there is only a (free) space smaller than the space required for one trial writing in the Test Area, i.e., in the case where there is no (free) space for trial writing in the Test Area, or in the case where the space remained for trial writing in the Test Area.

In the erase step, first, based on the flag on the Count Area, i.e., the count (number of times) of trial writing is carried out, it is confirmed whether there is a space for trial writing in the Test Area or not before trial writing is carried out.

If the count (number of times) of trial writing is carried out in the Test Area is a predetermined number of times (for example, 99–100), then CW (Continuous Wave) erase procedure is carried out in which the trial writing data recorded in the PCA, i.e., the trial writing data recorded in the Test Area and the data (flag) indicating the count (number of times) of trial writing is erased. Hereinafter, the trial writing data recorded in the Test Area and the data (flag) indicating the count (number of times) of trial writing will be referred to simply as the "trial writing data."

The trial writing data is erased by carrying out the CW erase procedure, thereby opening (creating) spaces for trial writing in the Test Area. Therefore, the trial writing can be carried out.

In this regard, the CW erase procedure is carried out from PCA start time T1 to PMA start time T2. Namely, in the CW erase procedure, the trial writing data that is recorded from the beginning of the Test Area to the end of the Count Area is sequentially erased.

Further, in the erase step, after the CW erase procedure was carried out, it is confirmed whether the trial writing data has been erased or not by the confirming means. More specifically, it is confirming whether an HF signal, which will be described later, has been erased or not by trying to reproduce trial writing data. In the case where the HF signal is detected, it is determined that the trial writing data has not been erased yet. On the other hand, in the case where the HF signal is not detected, it is determined that the trial writing data has been erased, and then trial writing in the Test Area is carried out.

In the case where it is determined that the trial writing data has been not erased, the CW erase procedure is carried out again to try to erase the trial writing data. This erasing procedure of the trial writing data is repeatedly carried out until the trial writing data is erased.

When the trial writing data is erased, i.e., during the CW erase procedure, the WRITE pulse signal is set at the erase level to drive the laser diode 5. The trial writing data that is recorded in the PCA is erased by carrying out overwriting procedures at an erase-level constant output of the laser beam.

In this case, the erase level (constant output of the laser beam) is constituted so as to be able to set any one of a plurality of levels, and in the erase step CW erase procedures can be respectively carried out by changing the erase levels. Thus, the erasing procedure of the trial writing data can be carried out at an appropriate erase level. In this regard, this erase-level output of the laser beam is smaller than the output level of the laser beam while the trial writing is carried out.

In this way, the trial writing data that is recorded in the Test Area can be surely erased in the optical disc drive 1.

When data (signals) is to be reproduced (read out) from the optical disc 2, the level of the WRITE pulse signal supplied from the laser control section 54 is maintained at a constant DC level corresponding to a read-out output. Thus, the output level of the laser beam is maintained at the read-out output level. For example, the read-out output may be about 1.0 mW (milliwatt).

During reproduction, the laser beam is emitted to a predetermined track of the optical disc 2 from the laser diode 5 in the optical pick-up 3. The laser beam is reflected on the optical disc 2, and the reflected beam is received by means of the split photodiode 6 in the optical pick-up 3.

Then, electrical current in response to the amount of light received is outputted from the split photodiode 6. This current is then converted into the voltage by means of an I-V amplifier (not shown in the drawings) in order to be outputted from the optical pick-up 3.

The voltage outputted from the optical pick-up 3 (detected signal) is inputted into the RF amplifier IC 40. In the RF amplifier IC 40, the detected signal undergoes predetermined signal processing such as addition, amplification and the like to generate an HF (RF) signal. The HF signal is an analog signal corresponding to pits and lands written onto (formed in) the optical disc 2.

The HF signal is inputted into the servo processor 51. In the servo processor 51, the HF signal is digitized, and then undergoes EFM demodulation (Eight to Fourteen Modulation), and then decoded to a predetermined form of data (DATA signal) to input into the decoder 52.

Then, the data is decoded to a predetermined form of data for communication (transmission) in the decoder 52, and transmitted to the external device such as a computer via the interface control section (not shown in the drawings).

Tracking control, sled control, focus control, and rotation number control (rotational speed control) in the reproducing operation, which are mentioned above, are carried out as follows.

As mentioned above, the voltage signal, into which the current signal supplied from the split photodiode 6 in the optical pick-up 3 is converted, is inputted into the RF amplifier IC 40.

The RF amplifier IC 40 generates the tracking error (TE) signal (voltage signal) based on the current-voltage (I-V) converted signal supplied from the split photodiode 6.

The tracking error signal is a signal that represents an amount of displacement of the objective lens in the radial direction from the center of the track (i.e., a shift length of the objective lens in the radial direction from the center of the track) and the direction thereof.

The tracking error signal is inputted into the servo processor 51. In the servo processor 51, the tracking error signal may undergo predetermined signal processing such as inversion of phase, amplification and the like, thereby generating a tracking servo signal (voltage signal). Based on the tracking servo signal, a predetermined drive voltage is applied to the tracking actuator 41 via the driver 21. The objective lens moves toward the center of the track by driving the tracking actuator 41. Namely, the tracking servo is engaged.

A limit exists to follow the objective lens to the track only with the drive of the tracking actuator 41. Therefore, to cover the tracking, the objective lens may be controlled so as to be returned to the reference position (carry out the sled control) by moving, under the drive of the sled motor 7 via the driver 22, the optical pick-up base toward the direction equal to the moving direction of the objective lens.

The RF amplifier IC 40 also generates a focus error (FE) signal (voltage signal) based on the current-voltage converted signal supplied from the split photodiode 6.

The focus error signal is a signal that represents an amount of displacement of the objective lens in the optical axis direction (rotational axis direction) from a focus position (i.e., a shift length of the objective lens from the focus position in the optical axis direction (rotational axis direction)).

The focus error signal is inputted into the servo processor 51. In the servo processor 51, the focus error signal may undergo predetermined signal processing such as inversion of phase, amplification and the like, thereby generating a focus servo signal (voltage signal). Based on the focus servo signal, a predetermined driving voltage is applied to the focusing actuator 42 via the driver 21. The objective lens moves toward the focus position by driving the focusing actuator 42. Namely, the focus servo is engaged.

Further, in the servo processor 51, a control signal (voltage signal) to control the rotation number (rotational speed) of the spindle motor 11, i.e., a control signal to set to a target value the rotation number of the spindle motor 11, is generated. Then the control signal is inputted into the driver 23.

The driving signal (voltage signal) to drive the spindle motor 11 is generated based on the control signal in the driver 23.

The driving signal outputted from the driver 23 is inputted into the spindle motor 11. The spindle motor 11 is then driven based on the driving signal. Further, the spindle servo is engaged so that the rotation number of the spindle motor 11 becomes equal to the target value.

Further, when the optical pick-up 3 (i.e., the objective lens) is moved to a target position on the optical disc 2, i.e., a target track (target address), track jump control operation is carried out. In the track jump control operation, the drive of the sled motor 7 and the drive of the actuator 4 are respectively controlled to move the optical pick-up 3 (objective lens) to the target track (target address) by carrying out a rough search (rough seek), a fine search (accurate seek) or a combination thereof.

Next, the control operation of the control means 9 during the erase step for erasing trial writing data will be described.

Figure 5:
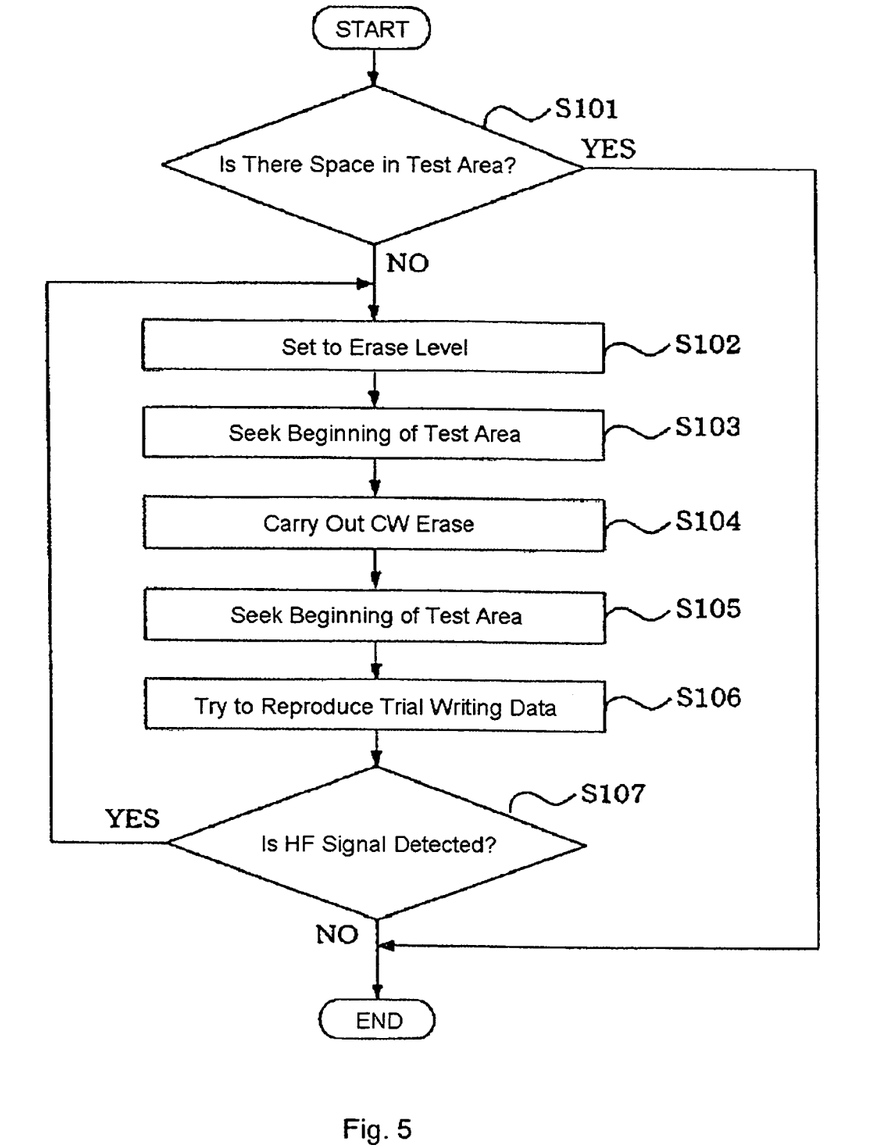
FIG. 5 is a flowchart illustrating control operation of control means during an erase step for erasing trial writing data according to the present invention.

FIG. 5 is a flowchart illustrating the control operation of the control means 9 during the erase step for erasing trial writing data. Hereinafter, a description will be given with reference to this flowchart.

First, the optical disc 2 is loaded on the optical disc drive, and it is confirmed whether there is space in the Test Area of the optical disc 2 or not (Step S101). In the case where there is space in the Test Area, the erase step is ended, and trial writing to the Test Area is carried out.

On the other hand, in the case where there is no space in the Test Area, an output level of the laser beam is set at a predetermined erase level (Step S102), and the optical pick-up 3 is sought toward the beginning of the Test Area of the optical disc 2 (Step S103).

Next, the CW erase procedure is carried out at the output level of the laser beam that is set in Step S103, i.e., a predetermined erase level (Step S104). In this CW erase procedure, as mentioned above, the trial writing data that is recorded from the beginning of the Test Area to the end of the Count Area is sequentially erased.

Then, the optical pick-up 3 is sought toward the beginning of the Test Area again (Step S105) to try to reproduce the trial writing data (Step S106).

Next, it is determined whether the HF signal is detected by reproducing the trial writing data (Step S107). In a case of detecting the HF signal, i.e., in the case where the trial writing data has not been erased yet, this operation (program) returns to Step S102 and steps following Step S102 are executed again. Therefore, retry of the erase procedure of the trial writing is repeatedly carried out until the trial writing data is erased.

On the other hand, in the case where the HF signal is not detected in Step S107, i.e., in the case where the trial writing data has been erased, this erase step is ended. When the erase step is ended, the trial writing to the Test Area is carried out. Therefore, an appropriate writing output level of the laser beam can be determined.

As described above, according to the optical disc drive 1 trial writing data can be surely erased.

Therefore, in the OPC procedure, the trial writing to the Test Area is properly carried out, and the output level of the laser beam can be surely set at an appropriate value.

Further, both writing (recording) actual data and reading out (reproducing) the recorded data can be carried out suitably.

As described above, it should be noted that even though the optical disc drive of the present invention has been described with reference to the embodiment shown in the drawings, the present invention is not limited to such a structure, various elements described above can be replaced with any other element capable of performing the same or a similar function.

For example, it is possible to the optical disc drive of the present invention to not only devices capable of recording and reproducing but also devices for recording only.

It is also possible to apply the optical disc drive of the present invention to other various optical disc drives for recording onto and reproducing from or recording onto various types of optical discs.

Furthermore, the optical disc drive of the present invention may be constituted so that, if the trial writing data has not been erased yet after CW erase procedure, the erase level is set to one step higher than the present step and the CW erase procedure is carried out again.

INDUSTRIAL APPLICABILITY

As explained above, according to the present invention, it is possible to erase the trial writing data that is recorded in the Test Area of the optical disc surely.

Therefore, in the OPC procedure, the trial writing to the Test Area is properly carried out, and the output level of the laser beam can be surely set at an appropriate value.

What is claimed is:

1. An optical disc drive which can record and reproduce data to and from an optical disc when the optical disc is loaded into the optical disc drive, the optical disc having a test area for trial writing and a count area for recording a count number of carrying out trial writing in the test area, the optical disc drive comprising:

an optical pick-up capable of recording the data to the optical disc by emitting a laser beam with any one of a plurality of output levels onto the optical disc;

judging means for judging whether there is free space for carrying out the trial writing again in the test area on the basis of the count number of carrying out trial writing in the test area recorded in the count area;

data erasing means for erasing trial writing data recorded in the test area and the count area from the beginning of the test area to the end of the count area using the laser beam emitted from the optical pick-up, the data erasing means erasing the trial writing data in the case where the judging means judges there is no free space in the test area; and confirming means for confirming whether the trial writing data has been erased or not by the data erasing means on the basis of whether an HF signal is detected by the optical pick-up when reproducing the trial writing data recorded from the beginning of the test area to the end of the count area;

wherein, in the case in which the confirming means confirms that the trial writing data has not been erased after the data erasing means carried out the erasing of the trial writing data, the data erasing means carries out the erasing of the trial writing data again using the laser beam with the output level higher than the previous output level, and the data erasing means repeatedly carries out the erasing of the trial writing data until the confirming means confirms that the entire trial writing data has been erased.

2. The optical disc drive according to claim 1, wherein the data erasing means erases the trial writing data in the case in which the count number of carrying out trial writing becomes more than a predetermined number.

3. The optical disc drive according to claim 2, wherein the predetermined number is 99 or 100.

4. The optical disc drive according to claim 1, wherein the optical disc to and from which the optical disc drive records and/or reproduces data includes an overwritable optical disc.

5. The optical disc drive according to claim 4, wherein the overwritable optical disc includes a CD-RW.

6. The optical disc drive according to claim 1, wherein the output level of the laser beam while the data erasing means erases the trial writing data is lower than the output level of the laser beam during trial writing.

* * * * *